(12) United States Patent
Takasuga (10) Patent No.: US 11,999,334 B2
(45) Date of Patent: Jun. 4, 2024

(54) BRAKE SYSTEM

(71) Applicant: TOYOTA JIDOSHA KABUSHIKI KAISHA, Toyota (JP)

(72) Inventor: Kazuki Takasuga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 17/532,262

(22) Filed: Nov. 22, 2021

(65) Prior Publication Data

US 2022/0169218 A1 Jun. 2, 2022

(30) Foreign Application Priority Data

Nov. 27, 2020 (JP) ................................. 2020-196780

(51) Int. Cl.
*B60T 8/17* (2006.01)
*B60T 7/20* (2006.01)
*B60T 8/1755* (2006.01)
*B60W 60/00* (2020.01)

(52) U.S. Cl.
CPC .............. *B60T 8/1755* (2013.01); *B60T 7/20* (2013.01); *B60T 8/1701* (2013.01); *B60T 2210/20* (2013.01); *B60T 2250/00* (2013.01); *B60T 2250/02* (2013.01); *B60W 60/00256* (2020.02)

(58) Field of Classification Search
CPC ........ B60T 8/1755; B60T 7/20; B60T 8/1701; B60T 2210/20; B60T 2250/00; B60T 2250/02; B60T 8/28; B60T 8/323; B60T 13/662; B60T 13/665; B60T 17/228; B60T 8/1708; B60T 8/18; B60W 60/00256
See application file for complete search history.

(56) References Cited

U.S. PATENT DOCUMENTS

| | | | | |
|---|---|---|---|---|
| 4,231,442 A | * | 11/1980 | Birkeholm | B64F 1/22 280/446.1 |
| 6,135,396 A | * | 10/2000 | Whitfield | B61L 27/14 246/4 |
| 2014/0229058 A1 | * | 8/2014 | Herder | B60T 17/228 701/34.4 |
| 2016/0019497 A1 | * | 1/2016 | Carvajal | H04L 67/104 705/333 |
| 2016/0101766 A1 | * | 4/2016 | Hu | B60T 8/24 701/70 |
| 2022/0402468 A1 | * | 12/2022 | Kulkarni | B60T 8/1708 |

FOREIGN PATENT DOCUMENTS

| | | |
|---|---|---|
| JP | H09-136625 A | 5/1997 |
| JP | 2002-060030 A | 2/2002 |
| JP | 2003-081075 A | 3/2003 |
| JP | 2007-210594 A | 8/2007 |
| JP | 2010-143320 A | 7/2010 |

* cited by examiner

*Primary Examiner* — Rodney A Butler
(74) *Attorney, Agent, or Firm* — Dinsmore & Shohl LLP (57) ABSTRACT

A brake system for a combination vehicle in which a plurality of vehicles are coupled in a line, including: a plurality of brake devices respectively provided for the plurality of vehicles; and a controller configured to control the plurality of brake devices, wherein the controller is configured to control a braking force applied to each of the plurality of vehicles based on a loaded weight or a weight of each of the plurality of vehicles.

17 Claims, 8 Drawing Sheets

BRAKE SYSTEM

CROSS REFERENCE TO RELATED APPLICATION

The present application claims priority to Japanese Patent Application No. 2020-196780, which was filed on Nov. 27, 2020, the disclosure of which is herein incorporated by reference in its entirety.

BACKGROUND

Technical Field

The following disclosure relates to a brake system for a combination vehicle constituted by a plurality of vehicles coupled in a line.

Description of Related Art

Special consideration is required in braking a combination vehicle constituted by a plurality of vehicles that are coupled in a line. For instance, the combination vehicle may suffer from a phenomenon in which the combination vehicle is bent at a coupler when braked, namely, the combination vehicle may suffer from what is called jackknife phenomenon when braked. In Patent Document 1 (Japanese Patent Application Publication No. 2007-210594), the coupler is fixed to prevent the phenomenon.

SUMMARY

The inventor of the present application has obtained the following findings. In the combination vehicle constituted by a plurality of vehicles for each of which a brake device is provided, optimization of the magnitude, the timing of generation, etc., of the braking force generated by each brake device enables the combination vehicle to enjoy advantages such as prevention of the jackknife phenomenon without fixing the coupler as conventionally performed. Accordingly, an aspect of the present disclosure is directed to a practical brake system for the combination vehicle.

In one aspect of the present disclosure, brake systems each for a combination vehicle in which a plurality of vehicles are coupled in a line, include:
  a plurality of brake devices respectively provided for the plurality of vehicles; and
  a controller configured to control the plurality of brake devices.

In one of the brake systems, the controller is configured to control a braking force applied to each of the plurality of vehicles based on a loaded weight or a weight of each of the plurality of vehicles.

In the other of the brake systems, when the combination vehicle is braked, the controller executes at least one of:
  a deceleration adjusting control in which a deceleration of one of any two of the plurality of vehicles that is located more rearward is not lower than a deceleration of the other of the above-indicated any two of the plurality of vehicles that is located more frontward; and
  a braking-force generation-timing adjusting control in which a timing of generation of a braking force in one of any two of the plurality of vehicles that is located more frontward is not earlier than a timing of generation of a braking force in the other of the above-indicated any two of the plurality of vehicles that is located more rearward.

The brake system according to the present disclosure enables the braking force generated by the brake device installed on each of the plurality of vehicles to be optimized, thus effectively preventing the jackknife phenomenon described above.

VARIOUS FORMS

There will be hereinafter exemplified and explained various forms of the brake system of the present disclosure. Each of the forms is numbered like the appended claims and depends from the other form or forms, where appropriate. This is for easier understanding of the present disclosure, and it is to be understood that combinations of constituent elements that constitute the present disclosure are not limited to those described in the following forms. That is, it is to be understood that the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the present disclosure.

(1) A brake system for a combination vehicle in which a plurality of vehicles are coupled in a line, including:
  a plurality of brake devices respectively provided for the plurality of vehicles; and
  a controller configured to control the plurality of brake devices.

This form and some forms that follow this form constitute a base of the present disclosure. The combination vehicle according to this form may include a vehicle not equipped with the brake device. In other words, the present disclosure is applicable to a combination vehicle in which such a vehicle not belonging to the plurality of vehicles described above may be coupled to a foremost or a rearmost one of the plurality of vehicles or may be coupled between any two of the plurality of vehicles. The structure of the brake device is not limited to any particular one. There may be widely employable brake devices with known structures.

(2) The brake system according to the form (1), wherein only a foremost vehicle among the plurality of vehicles of the combination vehicle includes a drive device, and each of the plurality of vehicles other than the foremost vehicle is capable of carrying objects and is towed by the foremost vehicle.

This form relates to the combination vehicle for transporting loads in factories, business facilities, etc. In the combination vehicle, an amount of loads loaded on each of the vehicles that are towed, namely, a loaded weight of each of the vehicles that are towed, changes. It is accordingly significant to control the braking force to be applied to each of the plurality of vehicles based on the loaded weight or a weight of each vehicle. It is noted that the structure of the drive device is not limited to any particular one. There may be widely employable drive devices with known structures. The present disclosure is applicable to a combination vehicle in which some of the plurality of vehicles are equipped with the drive device though such a combination vehicle does not belong to this form. The term "object(s) is a concept including not only load(s) but also occupant(s).

(3) The brake system according to the form (1) or (2), wherein the combination vehicle is configured to travel along a set route by automated driving and to stop at one or more stop points set in the route.

This form relates to the combination vehicle configured to be automatically driven. The present disclosure is applicable to a combination vehicle driven by a human driver. In this case, it is possible to apply an appropriate braking force to a certain extent by a brake operation performed by the human driver. In the combination vehicle driven automatically, in contrast, the brake operation by the human driver is not performed. Thus, the braking force control executed for each vehicle according to the present disclosure is effectively applicable to the combination vehicle of this form.

(4) The brake system according to any one of the forms (1)-(3), wherein the controller includes a plurality of in-vehicle units respectively provided for the plurality of vehicles so as to correspond to the plurality of brake devices, each of the plurality of in-vehicle units being configured to control a corresponding one of the plurality of brake devices.

(5) The brake system according to the form (4), wherein the controller includes a central controller configured to communicate with each of the plurality of in-vehicle units and to centrally control the plurality of in-vehicle units.

In the above two forms, the brake control of the combination vehicle is executed such that the brake devices of the plurality of vehicles are individually controlled, thus enabling the brake control to be executed efficiently. The central controller may be installed on the foremost vehicle, for instance. In this case, the in-vehicle unit of the foremost vehicle may function as the central controller.

(6) The brake system according to any one of the forms (1)-(5), wherein the controller is configured to control a braking force applied to each of the plurality of vehicles based on a loaded weight or a weight of each of the plurality of vehicles.

This form is one form of the present disclosure. This form enables an appropriate braking force to be applied to each vehicle. Specifically, this form enables application of the braking force to each vehicle for achieving a deceleration required for each vehicle, namely, for achieving an individual vehicle deceleration. The "loaded weight" in this form may be a weight of loads, occupants, etc., loaded on a vehicle body. The "weight" in this form is an overall weight of the vehicle, namely, a total of the weight of the vehicle body and the loaded weight. If the present brake system is configured such that the loaded weight of each vehicle is always recognized, the braking force corresponding to the required individual vehicle deceleration can be appropriately applied to the vehicle even when the loaded weight changes, irrespective of a value of the loaded weight. The loaded weight may be obtained by a loaded weight sensor provided for each vehicle or may be input to the controller by a manager, an operator, a driver, or the like.

(7) The brake system according to any one of the forms (1)-(5), wherein, when the combination vehicle is braked, the controller executes at least one of:

a deceleration adjusting control in which a deceleration of one of any two of the plurality of vehicles that is located more rearward is not lower than a deceleration of the other of said any two of the plurality of vehicles that is located more frontward; and a braking-force generation-timing adjusting control in which a timing of generation of a braking force in one of any two of the plurality of vehicles that is located more frontward is not earlier than a timing of generation of a braking force in the other of said any two of the plurality of vehicles that is located more rearward.

This form is another form of the present disclosure. This form effectively prevents what is called jackknife phenomenon. The "deceleration adjusting control" in this form includes a control in which the deceleration is determined to be the same for all of the plurality of vehicles. Further, the "braking-force generation-timing adjusting control" in this form includes a control in which the braking force is applied to all of the plurality of vehicles at the same timing. From the viewpoint of preventing the jackknife phenomenon, it is at least desirable that the deceleration of the rearmost vehicle be higher than the deceleration of the foremost vehicle, and it is at least desirable that the timing at which the braking force is applied to the rearmost vehicle is earlier than the timing at which the braking force is applied to the foremost vehicle. It is noted that the braking-force generation-timing adjusting control may also be referred to as a control of adjusting a moment of initiation of braking.

The brake system of this form may be configured such that only one of the deceleration adjusting control and the braking-force generation-timing adjusting control is executed or may be configured such that both the deceleration adjusting control and the braking-force generation-timing adjusting control may be executed. In the brake system capable of executing both the deceleration adjusting control and the braking-force generation-timing adjusting control, the deceleration adjusting control and the braking-force generation-timing adjusting control may be executed simultaneously. Alternatively, the deceleration adjusting control and the braking-force generation-timing adjusting control may be selectively executed when a certain condition is satisfied. In a case where the two controls are selectively executed, the braking-force generation-timing adjusting control may be executed when it is not desirable that the braking force applied to the combination vehicle as a whole become too large while the deceleration adjusting control may be executed when it is not desirable that the braking force applied to the combination vehicle as a whole become too small.

(8) The brake system according to the form (7), wherein the controller is configured to execute the deceleration adjusting control by controlling a braking force applied to each of the plurality of vehicles based on a loaded weight or a weight of each of the plurality of vehicles.

This form enables the deceleration adjusting control to be appropriately executed even when the loaded weight of each vehicle changes.

(9) The brake system according to the form (7) or (8), wherein the controller is configured to execute the deceleration adjusting control such that a deceleration is higher for the vehicles located more rearward.

(10) The brake system according to any one of the forms (7)-(9), wherein the controller is configured to execute the braking-force generation-timing adjusting control such that a timing of generation of a braking force is later for the vehicles located more frontward.

The above two forms prevent the jackknife phenomenon with high reliability.

(11) The brake system according to any one of the forms (7)-(10), wherein the controller executes the deceleration adjusting control when a required overall deceleration is higher than a set deceleration and executes the braking-force generation-timing adjusting control when the required overall deceleration is not higher than the set deceleration, the required overall deceleration being a deceleration required for the combination vehicle as a whole.

This form is a form relating to a changeover between the deceleration adjusting control and the braking-force generation-timing adjusting control in a case where the two controls are selectively executed. Specifically, the changeover between the two controls is made based on the required overall deceleration. In this form, the deceleration adjusting control is executed when sudden braking is required while the braking-force generation-timing adjusting control is executed when sudden braking is not required, for instance.

(12) The brake system according to any one of the forms (7)-(11), wherein the controller executes the deceleration adjusting control when the combination vehicle is braked at a specific place and executes the braking-force generation-timing adjusting control when the combination vehicle is braked at a place other than the specific place.

(13) The brake system according to the form (12), wherein the specific place is a downhill.

Each of the above two forms is another form relating to the changeover between the deceleration adjusting control and the braking-force generation-timing adjusting control in a case where the two controls are selectively executed. Specifically, the changeover between the two controls is made based on a place where the combination vehicle is braked. When the combination vehicle is braked at a place where a large braking force needs to be generated such as a downhill, the deceleration adjusting control is executed. When the combination vehicle is braked at a place other than the place described above, the braking-force generation-timing adjusting control is executed.

A case is considered in which are made both the changeover based on the required overall deceleration and the changeover based on the place where the combination vehicle is braked. In this case, the deceleration adjusting control is executed when at least one of i) a condition that the required overall deceleration is higher than a set deceleration and ii) a condition that the place where the combination vehicle is braked is the specific place is satisfied. The braking-force generation-timing adjusting control is executed when none of the two conditions are satisfied.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained below in detail a brake system according to one embodiment of the present disclosure. It is to be understood that the present disclosure is not limited to the details of the following embodiment but may be embodied based on the forms described in Various Forms and may be changed and modified based on the knowledge of those skilled in the art.

Figure 1:
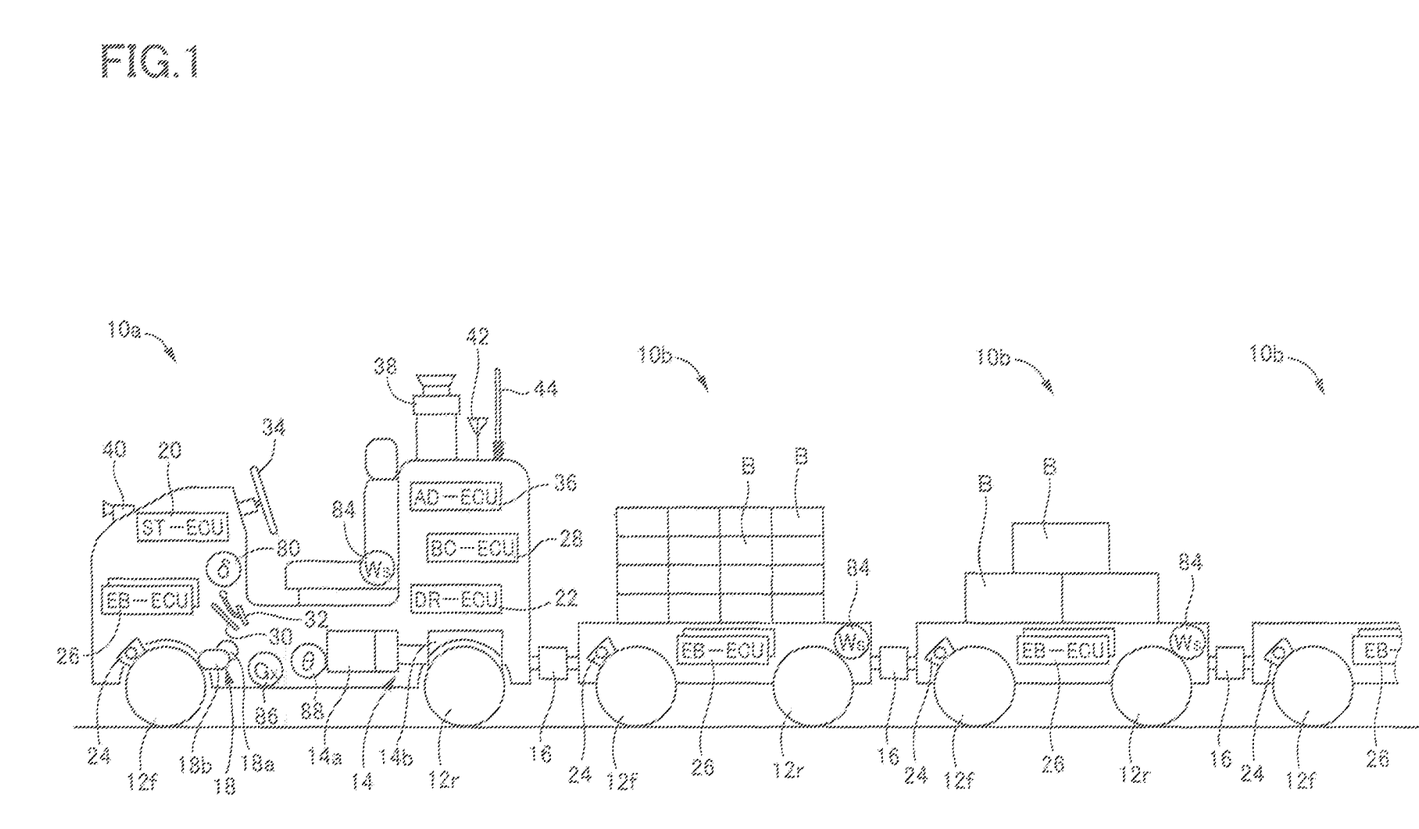
FIG. 1 is a schematic view illustrating an overall structure of a brake system according to an embodiment of the present disclosure and a combination vehicle equipped with the brake system.

A. Brake System and Overall Structure of Combination Vehicle Equipped with Brake System As schematically illustrated in FIG. 1, the brake system according to the present embodiment is installed on a combination vehicle. The combination vehicle is constituted by a plurality of vehicles that are coupled in a line. The combination vehicle is used for transporting loads as objects in factories, business facilities, etc. The left side in FIG. 1 corresponds to the front side of the combination vehicle. The plurality of vehicles that constitute the combination vehicle includes a tow vehicle 10a that is a foremost vehicle and a plurality of carriers 10b that follow the tow vehicle 10a. Each of the carriers 10b is configured to be loaded with loads. In this respect, when the tow vehicle 10a and the carriers 10b need not be distinguished from each other, each of the tow vehicle 10a and the carriers 10b will be referred to as "vehicle 10" where appropriate.

Each vehicle 10 is a four-wheeled vehicle and includes two pairs of wheels respectively provided at front and rear portions of the vehicle 10, i.e., a pair of front wheels 12f and a pair of rear wheels 12r. In the combination vehicle, a drive device 14 is installed on only the tow vehicle 10a. No drive devices are installed on the carriers 10b. The vehicles 10 are coupled via couplers 16. Each coupler 16 allows relative pivoting (relative turning) of the corresponding two vehicles 10, thus allowing easy turning, easy entry into and exit from a slope, etc., of the combination vehicle.

Each coupler 16 is configured to allow easy coupling and decoupling of the corresponding two vehicles 10 to and from each other, thus allowing the combination vehicle to be changed in its configuration, namely, allowing the carrier 10b coupled to the tow vehicle 10a to be changed to another carrier 10b or allowing a change in the number of the carriers 10b coupled to the tow vehicle 10a, for instance.

The tow vehicle 10a includes a steering device 18 in addition to the drive device 14. In the tow vehicle 10a, the pair of front wheels 12f are steerable wheels while the pair of rear wheels 12r are drive wheels. The steering device 18 includes a steering actuator 18b that utilizes a steering motor 18a as a drive source. The steering device 18 is configured to steer the pair of front wheels 12f. The drive device 14 includes a drive motor 14a and a speed reducer 14b having a differential function. The drive device 14 is configured to drive the pair of rear wheels 12r. In the following explanation, the front wheels 12f and the rear wheels 12r may be collectively referred to as "wheels 12" where appropriate.

The steering device 18 is controlled by a steering electronic control unit 20 that includes a computer, a drive circuit for the steering motor 18a, etc. The steering electronic control unit 20 will be hereinafter referred to as "steering ECU 20" where appropriate and is indicated as "ST-ECU" in the drawings. The drive device 14 is controlled by a drive electronic control unit 22 that includes a computer, a drive circuit for the drive motor 14a, etc. The drive electronic control unit 22 will be hereinafter referred to as "drive ECU 22" where appropriate and is indicated as "DR-ECU 22" in the drawings.

Each vehicle 10 is equipped with a pair of brake devices 24 respectively provided for the pair of front wheels 12. Each brake device 24, a structure of which will be later explained, is an electric brake device that includes a brake motor as a drive source. For controlling the pair of the brake devices 24, each vehicle 10 is equipped with a pair of electric-brake electronic control units 26 each including a computer, a drive circuit for the brake motor, etc. Each electric-brake electronic control unit 26 will be hereinafter referred to as "electric brake ECU 26" where appropriate and is illustrated as "EB-ECU" in the drawings. For controlling the brake devices 24 of the respective vehicles 10 in a centralized manner, the tow vehicle 10a is equipped with a brake central electronic control unit 28 that includes a computer as a principal constituent element. The brake central electronic control unit 28 will be hereinafter referred to as "brake central ECU 28" where appropriate and is indicated as "BC-ECU" in the drawings.

It may be considered that the thus constructed combination vehicle includes one controller constituted by: the electric brake ECUs 26, each as an in-vehicle unit, installed on the respective vehicles 10; and the brake central ECU 28, as a central controller, configured to centrally control the electric brake ECUs 26. The brake system of the present combination vehicle, namely, the brake system of the present embodiment, is constituted by the brake devices 24 respectively installed on the vehicles 10 and the controller.

The combination vehicle is operable by a driver who rides on the tow vehicle 10a. Thus, the tow vehicle 10a is provided with an accelerator pedal 30 as an accelerator operating member, a brake pedal 32 as a brake operating member, and a steering wheel 34 as a steering operating member. On the other hand, the combination vehicle is automatically operable without being operated by the driver who rides on the tow vehicle 10a. That is, the combination vehicle can perform automated driving. Thus, the tow vehicle 10a is provided with an automated-driving electronic control unit 36 as a controller for automated driving. The automated-driving electronic control unit 36 is constituted by a computer as a principal constituent element. The automated-driving electronic control unit 36 will be hereinafter referred to as "automated driving ECU 36" where appropriate and is indicated as "AD-ECU" in the drawings. The tow vehicle 10a is further provided with a lidar 38, a camera 40 for forward monitoring, and a GPS antenna 42 for receiving GPS signals.

The tow vehicle 10a is provided with a CAN (controllable area network or car area network). The ECUs 20, 22, 26, 28, 36 perform transmission and reception of signals and information with one another via the CAN. The tow vehicle 10a is further provided with a communication antenna 44. The brake central ECU 28 performs transmission and reception of signals and information with the electric brake ECUs 26 of the respective carriers 10b through wireless communication.

B. Structure of Brake Device

Figure 2:
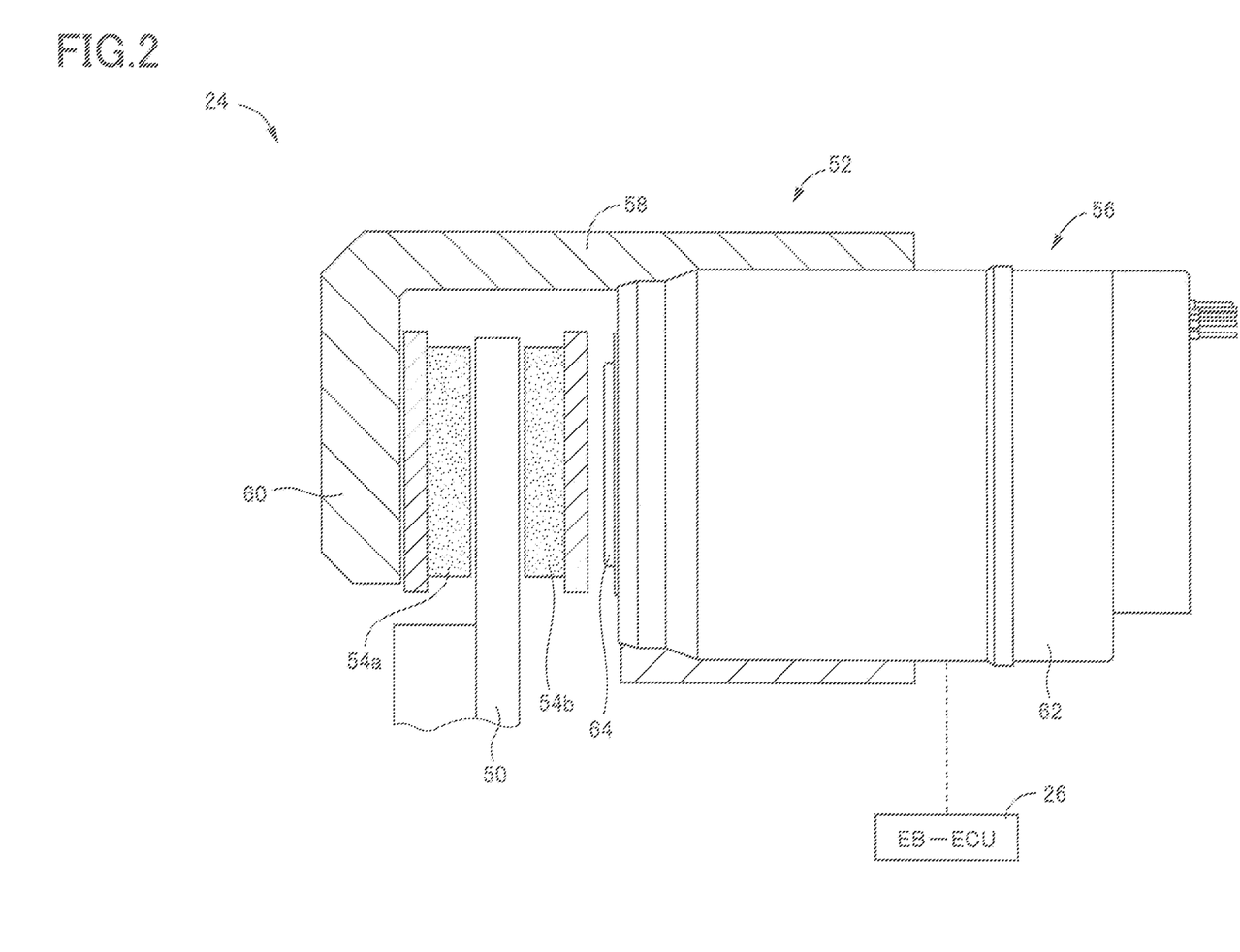
FIG. 2 is a view of a brake device of each vehicle of the combination vehicle.

Each brake device 24 is for stopping rotation of a corresponding one of the two front wheels 12f of each vehicle 10. The brake device 24 is operated by a force of an electric motor as a drive source. As illustrated in FIG. 2, the brake device 24 includes a disc rotor 50, as a rotation body, that rotates with the front wheel 12f and a brake caliper (hereinafter simply referred to as "caliper" where appropriate) 52 disposed so as to straddle the disc rotor 50. The caliper 52 includes: brake pads 54a, 54b (hereinafter simply referred to as "pads 54a, 54b" where appropriate) each as a friction member; and a brake actuator (hereinafter simply referred to as "actuator" where appropriate) 56 including the brake motor that is the electric motor and configured to push the pads 54a, 54b against the disc rotor 50 by the force of the brake motor for stopping rotation of the front wheel 12f.

For the sake of convenience, the left side and the right side in FIG. 2 are referred to as a front side and a rear side, respectively. The pad 54a located on the front side is supported by a front end portion (claw portion) 60 of the caliper main body 58. The actuator 56 is held by a rear-side portion of the caliper main body 58 such that a housing 62 of the actuator 56 is fixed to the rear-side portion of the caliper main body 58. The actuator 56 includes a piston 64 held by the housing 62 so as to be movable forward and rearward. When the piston 64 moves forward, a distal end portion of the piston 64 comes into engagement with the pad 54b located on the rear side. When the piston 64 further moves forward while being kept engaged with the rear-side pad 54b, the pair of pads 54a, 54b are pushed against the disc rotor 50 such that the disc rotor 50 is sandwiched by and between the pads 54a, 54b. Owing to the pushing by the pads 54a, 54b, there is generated a braking force for stopping rotation of the front wheel 12f in dependence on a friction force between the disc rotor 50 and the pads 54a, 54b, in other words, there is generated a braking force for reducing the speed of the vehicle or stopping the vehicle.

Figure 3:
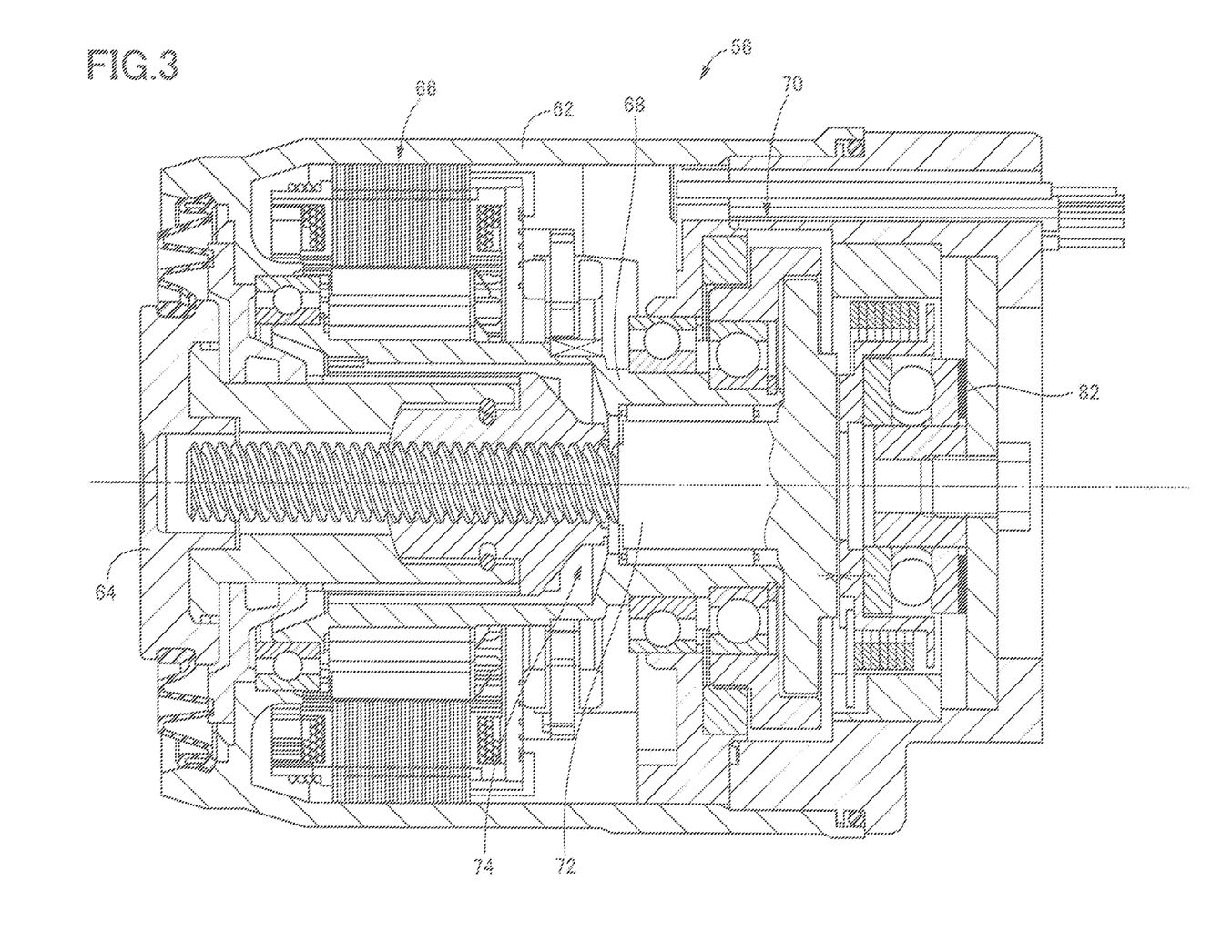
FIG. 3 is a cross-sectional view of a brake actuator of the brake device.

The actuator 56 will be briefly explained referring to a cross-sectional view of FIG. 3. The actuator 56 is an electric brake actuator. The actuator 56 includes, in addition to the housing 62 and the piston 64 described above, a brake motor 66 that is the electric motor as a drive source, a speed reduction mechanism 70 for decelerating rotation of the brake motor 66, specifically, rotation of a hollow motor shaft 68, and a motion converting mechanism 74 including a rotation shaft 72 configured to be rotated by the rotation of the brake motor 66 decelerated by the speed reduction mechanism 70. The motion converting mechanism 74 is configured to convert the rotating motion of the rotation shaft 72 into the forward and rearward movement of the piston 64.

The piston 64 moves forward and rearward by controlling a supply current to the brake motor 66. The magnitude of the pushing force of the pads 54a, 54b against the disc rotor 50, namely, the magnitude of the braking force, is generally proportional to the amount of the supplied electric current. The speed reduction mechanism 70 is a differential speed reduction mechanism including two internally meshing planetary gear mechanisms disposed in series. The motion converting mechanism 74 is a screw mechanism.

C. Control of Brake System i) Basic Control

The combination vehicle can be operated by the driver who rides on the tow vehicle 10a and can be automatically operated, namely, the combination vehicle can perform automated driving without being operated by the driver. In a case where the combination vehicle is operated by the driver, the drive ECU 22 determines, based on the operation amount of the accelerator pedal 30, the drive force to be generated by the drive device 14 and controls the drive motor 14a such that the determined drive force is generated. The steering ECU 20 determines the steering angle of the front wheels 12f of the tow vehicle 10a based on the operation angle of the steering wheel 34 and controls the steering actuator 18b such that the determined steering angle is attained.

Control of the brake system will be explained. The brake central ECU 28 detects an operation amount 8 of the brake pedal 32 via a brake operation amount sensor 80 (FIG. 1), determines, based on the operation amount 8, a required overall deceleration $G_T$ required for the combination vehicle as a whole, and determines, based on the required overall deceleration $G_T$, a required individual vehicle deceleration G(n) that is a deceleration required for each vehicle 10. It is noted that the required overall deceleration $G_T$ is determined to be 0 in a case where the brake pedal 32 is not operated. It is noted that "n" is a vehicular number that represents the ordinal number of the vehicle counted from the front side, as will be later explained in detail. The brake central ECU 28 transmits information on the required individual vehicle deceleration G(n) to the electric brake ECU 26 of the tow vehicle 10a that is the foremost vehicle whose vehicular number is 1 (n=1) via a communication line and to the electric brake ECUs 26 of the respective carriers 10b that are the second and subsequent vehicles each of whose vehicular number is not less than 2 (n≥2) via wireless communication.

Each electric brake ECU 26 determines, based on the required individual vehicle deceleration G(n) transmitted thereto as the information, a braking force to be generated by the corresponding brake device 24, i.e., a required braking force F*. The electric brake ECU 26 then determines the pushing force of the pads 54a, 54b necessary for generating the required braking force F*, namely, the electric brake ECU 26 determines a target axial force S* that is an axial force (thrust force) S to be applied to the piston 64 of the actuator 56. The electric brake ECU 26 has a grasp of an actual axial force S via an axial force sensor 82 (FIG. 3) and identifies a difference between the actual axial force S and the target axial force S*, i.e., an axial force deviation ΔS. The electric brake ECU 26 determines a supply current I to be supplied to the brake motor 66 by a technique according to a feedback control law (PID control law) based on the axial force deviation ΔS, in other words, the electric brake ECU 26 determines the supply current I according to the following expression:

$$I = \alpha_P \cdot \Delta S + \alpha_I \cdot \int \Delta S dt + \alpha_D \cdot d\Delta S/dt$$

wherein the first term, the second term, and the third term on the right side are a proportional term, an integral term, and a derivative term, respectively, and "$\alpha_P$", "$\alpha_I$", and "$\alpha_D$" on the right side are a proportional term gain, an integral term gain, and a derivative term gain, respectively. The electric brake ECU 26 supplies the thus determined electric current I to the brake motor 66.

The brake central ECU 28 of the combination vehicle stores the configuration of the combination vehicle, in other words, the type and the number of the carriers 10 towed by the tow vehicle 10a and the order in which the carriers 10 are coupled, as a vehicle master file in which the vehicular number n and a vehicle ID are associated with each other. Though not explained in detail, the vehicle master file is automatically created every time the configuration of the combination vehicle changes, triggered by coupling or decoupling of two vehicles by any one of the couplers 16, for instance. The brake central ECU 28 performs communication with each of the electric brake ECUs 26 based on the stored configuration of the combination vehicle.

Figure 4:
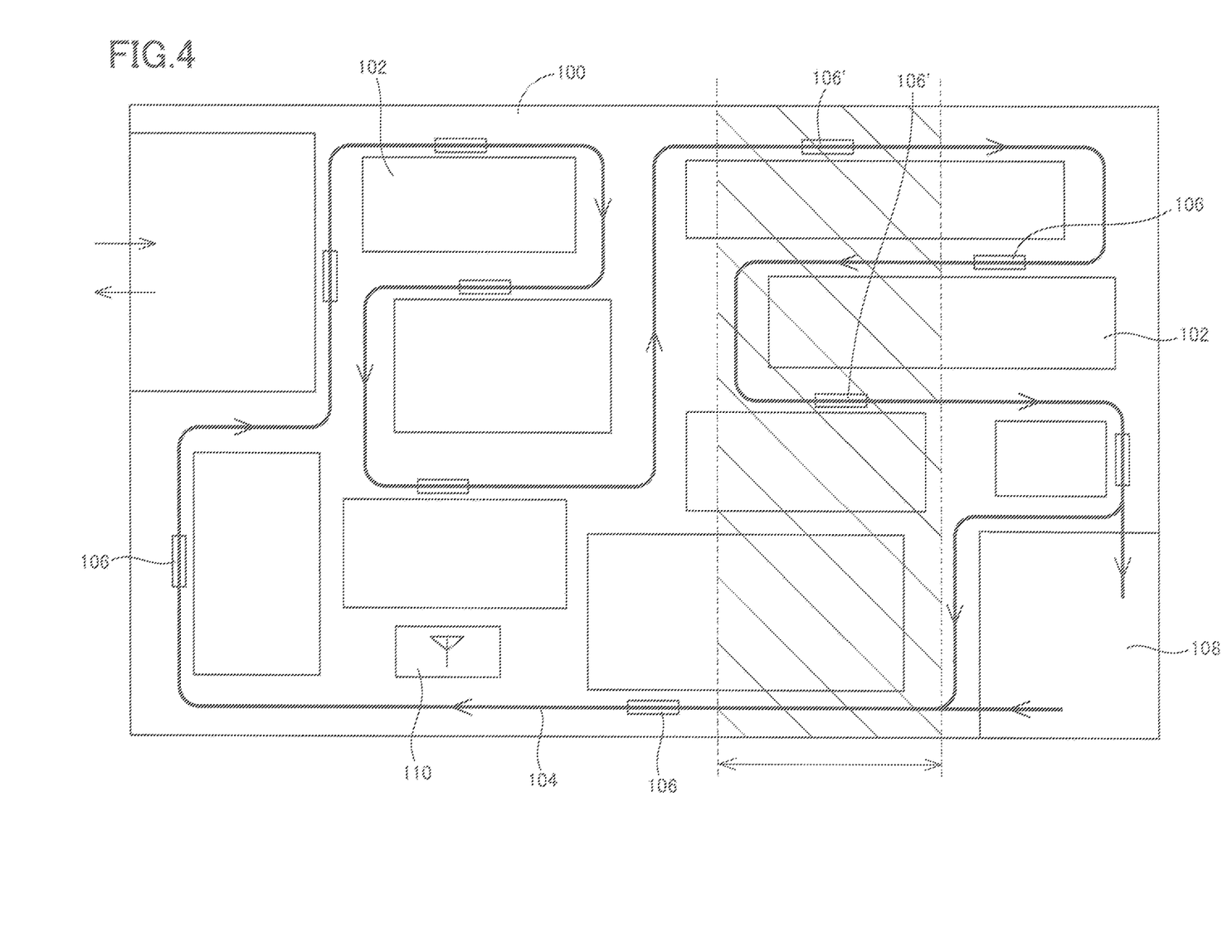
FIG. 4 is a schematic view of a travel route of the combination vehicle.

There will be next explained a case in which the combination vehicle travels by automated driving. The combination vehicle is configured to travel in one direction along a travel route 104 passing around buildings (production facilities or equipment) 102 in a business facility (factory) 100, as illustrated in FIG. 4. Stop points or positions (hereinafter each referred to as "station" where appropriate) 106 are provided in the travel route 104. In this respect, changing of the coupled state of the carriers 10b, inspections and maintenance of the combination vehicle, etc., are performed at a waiting site 108 outside the travel route 104.

The management center (management device) 110 has a grasp of the traveling position of the combination vehicle at the present time and the type and the amount of the loads. The management center 110 transmits, to the combination vehicle, commands as to stopping of the combination vehicle at the station 106 and starting of the combination vehicle from the station 106 via wireless communication. The automated driving ECU 36 that receives the commands give instructions to the drive ECU 22 to cause the combination vehicle to start from the station 106 and to travel along the travel route 104 at a set speed (hereinafter referred to as "vehicle speed" where appropriate), based on the commands. Based on the instructions, the drive ECU 22 determines the drive force to be generated by the drive device 14 and controls the drive motor 14a to generate the determined drive force.

The automated driving ECU 36 has a grasp of a position in the travel route 104 at which the combination vehicle is traveling at the present time, based on GPS signals and data obtained by the lidar 38 and the camera 40. This position will be hereinafter referred to as "traveling position" where appropriate. When the combination vehicle travels on a curve in the travel route 104, the automated driving ECU 36 transmits, to the steering ECU 20, information on the curve such as a radius of turning. The steering ECU 20 determines the steering angle of the front wheels 12f of the tow vehicle 10a based on the information and controls the steering actuator 18b such that the determined steering angle is attained.

In applying brakes to the combination vehicle for stopping the combination vehicle at the station 106, the automated driving ECU 36 transmits a brake-operation start signal to the brake central ECU 28 based on the traveling position of the combination vehicle so as to start the brake operation. The brake central ECU 28 is triggered by the brake-operation start signal to determine the required overall deceleration $G_T$ to be a predetermined deceleration. The brake central ECU 28 determines the required individual vehicle deceleration G(n) of each vehicle 10 based on the determined required overall deceleration $G_T$ and transmits information on the required individual vehicle deceleration G(n) to the electric brake ECUs 26 of each vehicle 10. As in the driving by the driver, each electric brake ECU 26 controls the corresponding brake device 24, namely, each electric brake ECU 26 controls the braking force to be generated by the corresponding brake device 24, based on the required individual vehicle deceleration G(n).

Though not explained in detail, the automated driving ECU 36 recognizes the existence of an obstacle located in front of the combination vehicle based on the detection by the camera 40, the lidar 38, etc., irrespective of whether the combination vehicle is being driven automatically or the combination vehicle is being driven by the driver. In a case where the possibility of a collision with the obstacle is increased, the automated driving ECU 36 transmits, to the brake central ECU 28, information on emergency braking (hereinafter referred to as "sudden braking" where appropriate) to brake the combination vehicle suddenly to avoid the collision with the obstacle. The brake central ECU 28 determines the required overall deceleration $G_T$ necessary for the sudden braking based on the information on the sudden braking. The brake central ECU 28 then determines the required individual vehicle deceleration G(n) of each vehicle 10 based on the required overall deceleration $G_T$ necessary for the sudden braking and transmits the information on the required individual vehicle deceleration G(n) to the electric brakes ECU 26 of each vehicle 10. Each electric brake ECU 26 controls the corresponding brake device 24 based on the required individual vehicle deceleration G(n) for performing the sudden braking.

ii) Determination of Braking Force Based on Vehicle Loaded Weight

As explained above, each carrier 10b of the combination vehicle is configured to be loaded with loads B. The weight of the carrier 10b changes depending on the weight of the load or loads B loaded on the carrier 10b. The weight of the tow vehicle 10a also changes depending on whether the combination vehicle is driven automatically or driven by the driver who rides on the tow vehicle 10. The weight of the tow vehicle 10a and the weight of each carrier 10b are each defined as a vehicle total weight $W_T$. The vehicle total weight $W_T$ of the vehicle 10 is a total of the body weight $W_B$ and a vehicle loaded weight $W_S$. That is, the vehicle total weight $W_T$ of the tow vehicle 10a is a total of the body weight $W_B$ and the weight of the driver when the combination vehicle is driven by the driver. The vehicle total weight $W_T$ of each carrier 10b is a total of the body weight $W_B$ and the weight of the load or loads B loaded on the carrier 10b.

The vehicle total weight $W_T$ largely influences the brake effectiveness. For accurately attaining the required individual vehicle deceleration G(n) determined by the brake central ECU 28, the present brake system is configured such that each electric brake ECU 26 determines the required braking force F' to be generated by the corresponding brake device 24 based on the vehicle loaded weight $W_S$, in other words, based on the vehicle total weight $W_T$, according to the following expression, and determines the target axial force S* explained above:

$$F^* = W_T \cdot G(n)$$

Each of the tow vehicle 10a and the carriers 10b of the present combination vehicle is equipped with a loaded weight sensor 84 for detecting the vehicle loaded weight $W_S$ of each vehicle 10. In this respect, the weight of the driver and the weight of the load or loads B may be managed by the management center (management device) 110. The vehicle loaded weight $W_S$ of each vehicle 10 may be identified based on information transmitted from the management center (management device) 110. As for the body weight $W_B$ of each vehicle 10, on the other hand, there are used values that are stored in advance in the corresponding electric brake ECUs 26.

iii) Jackknife Phenomenon and Prevention Thereof

Figure 5A:
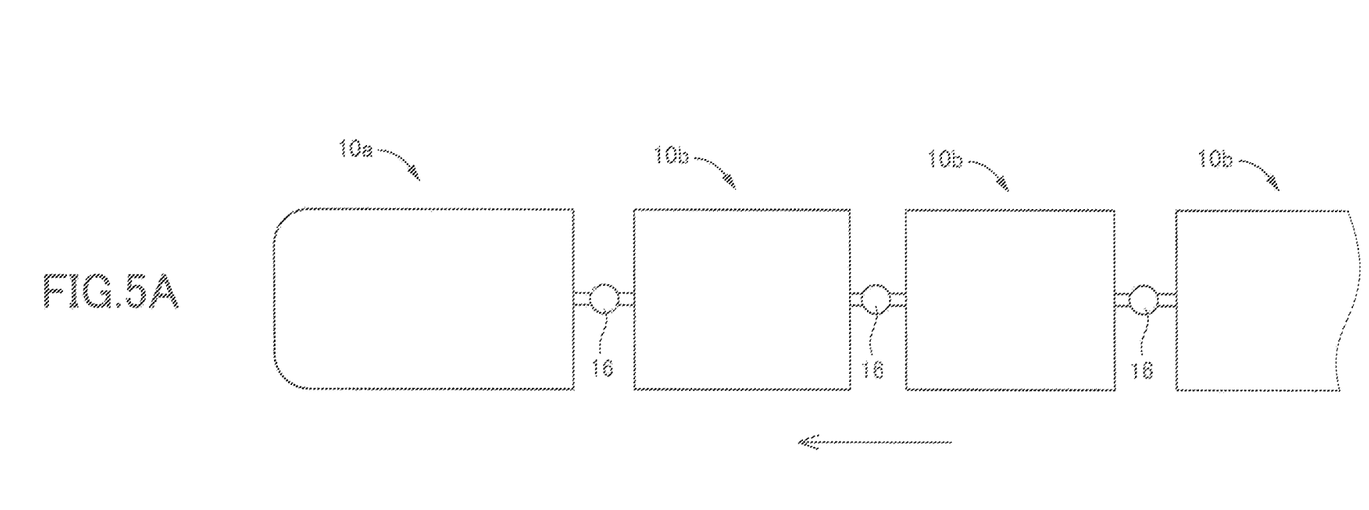
FIG. 5A is a schematic view of the combination vehicle not suffering from the jackknife phenomenon.
Figure 5B:
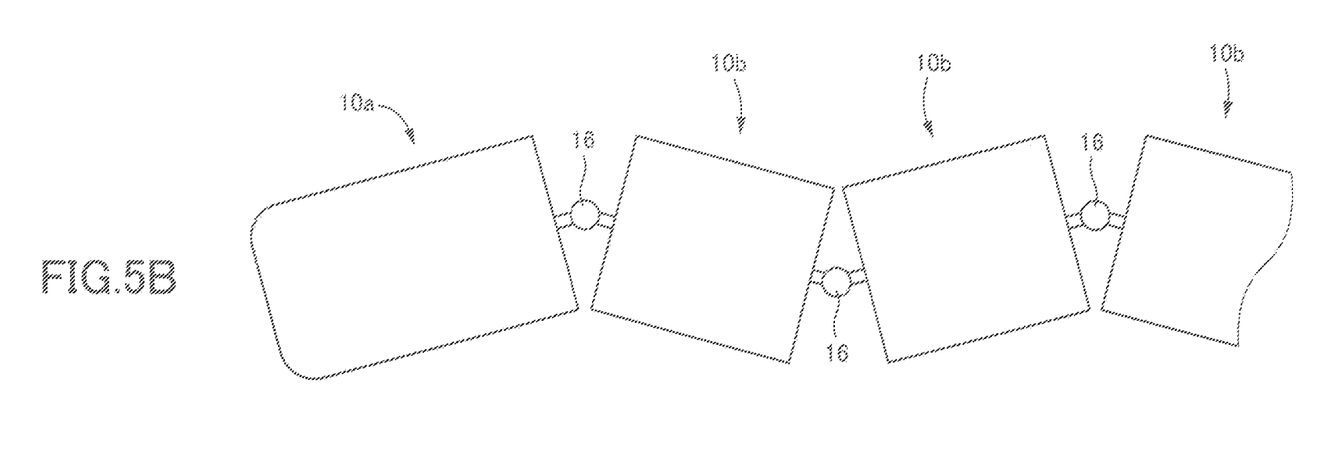
FIG. 5B is a schematic view of the combination vehicle suffering from a jackknife phenomenon.

FIGS. 5A and 5B illustrate the combination vehicle viewed from above. FIG. 5A illustrates the combination vehicle that is straightly traveling forward with the carriers 10b towed by the tow vehicle 10a. A case is considered in which the combination vehicle is braked in such a situation. When the decelerations of the vehicles 10 located more frontward are higher than the decelerations of the vehicles 10 located more rearward or when the braking forces are applied to the vehicles 10 located more frontward earlier than the vehicles 10 located more rearward, for instance, there may occur a phenomenon illustrated in FIG. 5B in which orientations of any of two vehicles 10 coupled by the corresponding coupler 16 differ from each other with respect to the coupler 16, namely, the combination vehicle is bent. The phenomenon is caused due to increased inertia of the vehicles located more rearward. This phenomenon is what is called jackknife phenomenon. The jackknife phenomenon is noticeable when the combination vehicle is turning.

To prevent the jackknife phenomenon of the combination vehicle, there has been a proposal to prevent the coupler 16 from allowing the corresponding two vehicles 10 to pivot relative to each other, namely, a proposal to fix the coupler 16, so as to prohibit the postures of the two vehicles 10 from changing relative to each other. The arrangement according to the proposal, however, makes the structure of the coupler 16 complicated. Thus, the proposed arrangement is not necessarily practical.

The brake system of the present embodiment is therefore configured to selectively execute special two controls, in relation to application of the braking force to each vehicle 10. One of the two controls is a deceleration adjusting control in which the plurality of brake devices 24 respectively provided for the plurality of vehicles 10 are controlled such that a deceleration of one of any two vehicles 10 that is located more rearward is not lower than a deceleration of the other of the above-indicated any two vehicles 10 that is locate more frontward. The other of the two controls is a braking-force generation-timing adjusting control in which the plurality of brake devices 24 respectively provided for the plurality of vehicles 10 are controlled such that a timing of generation of the braking force in one of any two vehicles 10 that is located more frontward is not earlier than a timing of generation of the braking force in the other of the above-indicated any two vehicles 10 that is located more rearward.

The deceleration adjusting control is executed by the brake central ECU 28. In the deceleration adjusting control, the plurality of brake devices 24 are controlled such that the deceleration is higher for the vehicles 10 located more rearward. Specifically, the required individual vehicle deceleration G(n) of each vehicle 10 is determined based on the required overall deceleration $G_T$ determined as described above according to the following expression:

$$G(n) = G_T \cdot (1 + (n-1) \cdot \Delta G)$$

In the above expression, "$\Delta G$" is a coefficient for providing a difference in the required individual vehicle deceleration G(n) between two vehicles 10 coupled by one coupler 16, i.e., a deceleration difference coefficient.

The required individual vehicle deceleration G(n) of each vehicle 10 determined as described above is increased by the difference in the required individual vehicle deceleration G(n) indicated above toward the vehicles 10 located more rearward. According to the braking force control executed by the electric brake ECU 26 based on the required individual vehicle deceleration G(n), there is applied the braking force that enables a higher deceleration for the vehicles 10 located more rearward. That is, in a case where the vehicle total weight $W_T$ is the same for all the vehicles 10, for instance, the braking force to be applied is larger for the vehicles 10 located more rearward. The deceleration adjusting control in which the braking force is thus applied to each vehicle 10 effectively prevents the jackknife phenomenon described above.

The braking-force generation-timing adjusting control is executed also by the brake central ECU 28. In the braking-force generation-timing adjusting control, the plurality of brake devices 24 are controlled such that the timing of generation of the braking force is later for the vehicles 10 located more frontward. Specifically, the brake central ECU 28 repeatedly executes a brake central program (that will be later explained in detail) at a short time pitch. In starting the braking-force generation-timing adjusting control, there is set a first-in first-out (FIFO) memory schematically illustrated in FIG. 8.

Figure 8:
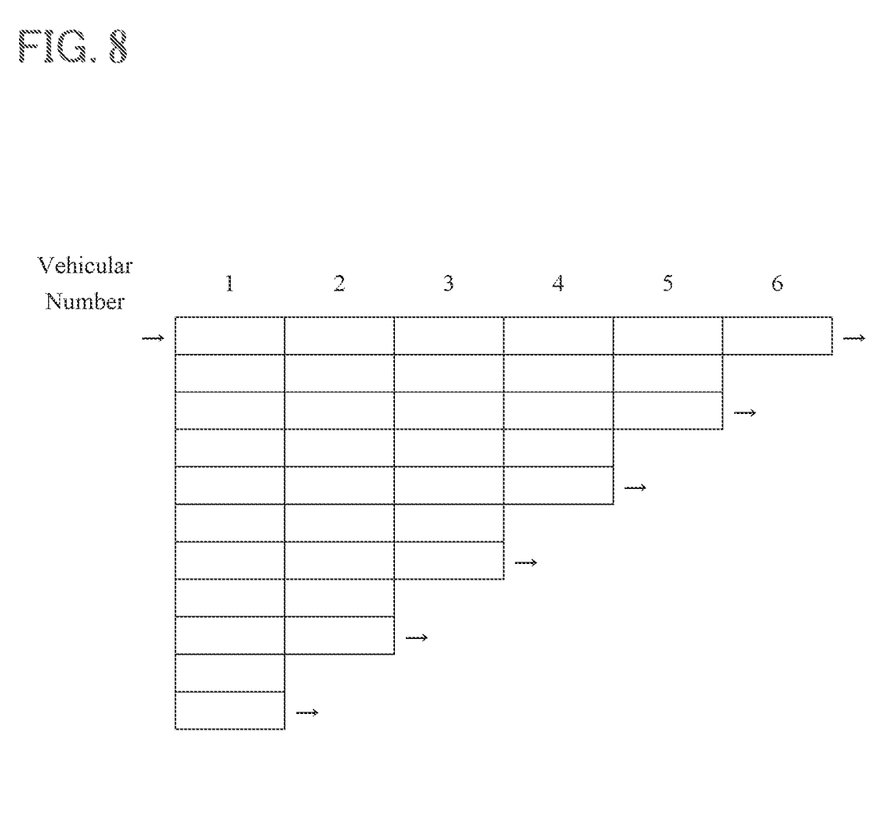
FIG. 8 is a schematic view of a table illustrating a first-in first-out (FIFO) memory.

The FIFO memory illustrated in FIG. 8 is set for the combination vehicle constituted by the tow vehicle 10a as the foremost vehicle and the five carriers 10b sequentially coupled to the tow vehicle 10a, namely, the combination vehicle constituted by the six vehicles 10 coupled in a line. The FIFO memory is set as a storage area in which cells are vertically arranged in a line for each vehicle. The FIFO memory of the present embodiment includes six columns of cells corresponding to the six vehicles 10. The required overall deceleration $G_T$ determined as described above is stored in each cell. The number of cells vertically arranged in one line decreases with an increase in the vehicular number. That is, the number of vertically arranged cells is smaller for the vehicles 10 located more rearward. Each time the brake central program is executed, the required overall deceleration $G_T$ stored in each cell is moved to another cell located immediately thereunder. That is, the FIFO memory is updated. The determined required overall deceleration $G_T$ is stored in the uppermost cell of each column. The required overall deceleration $G_T$ read out from the lowermost cell of each column is determined to be the required individual vehicle deceleration G(n) of the corresponding vehicle 10.

As explained above, in a case where there is no request for the braking force, the required overall deceleration $G_T$ is determined to be 0. The required overall deceleration $G_T$ changes to a value other than 0 from the moment of generation of the request for the braking force. Because the number of vertically arranged cells is greater for the vehicles 10 located more frontward, the timing of determining the required individual vehicle deceleration G(n) to be the value other than 0 is delayed more for the vehicles 10 located more frontward, with respect to the moment of generation of the request for the braking force. By thus determining the required individual vehicle deceleration G(n) of each vehicle 10, the application of the braking force generated by the braking force control executed by the electric brake ECU 26 is delayed toward the vehicles 10 located more frontward by a time corresponding to a product of: a difference in the number of vertically arranged cells between two neighboring columns; and the time pitch at which the brake central program is executed. The braking-force generation-timing adjusting control in which the timing of generation of the braking force is thus adjusted effectively prevents the jackknife phenomenon described above.

In the FIFO memory illustrated in FIG. 8, the difference in the number of cells between any two neighboring cells is schematically set to two. The difference may be suitably set depending on the degree at which the generation of the braking force is delayed. The FIFO memory illustrated in FIG. 8 is a memory for the combination vehicle constituted by six vehicles 10. The number of columns of cells may be increased or decreased depending on the number of the vehicles 10 of the combination vehicle.

As described above, the brake central ECU 28 is configured to selectively execute the deceleration adjusting control and the braking-force generation-timing adjusting control. Specifically, the brake central ECU 28 executes the deceleration adjusting control in a situation in which a relatively large braking force is required and executes the braking-force generation-timing adjusting control in a case where the deceleration adjusting control is not executed. That is, the brake central ECU 28 executes the deceleration adjusting control when the required overall deceleration $G_T$ is higher than a threshold deceleration $G_{T0}$ that is a set deceleration, in consideration of sudden braking, etc. Further, the brake central ECU 28 executes the deceleration adjusting control when the combination vehicle is braked at a specific place, namely, when the combination vehicle is braked on a downhill whose gradient is larger than a set gradient, in consideration of the necessity of a relatively large braking force. In other words, in a situation in which neither sudden braking nor braking on the downhill is performed, namely, in a situation in which a relatively large braking force is not required, the brake central ECU 28 executes the braking-force generation-timing adjusting control.

There will be briefly explained a determination as to whether the combination vehicle is traveling on the downhill whose gradient is larger than the set gradient when performing automated driving. A hatched region in FIG. 4 that is demarcated by dashed lines is an inclined surface that goes down from left to right in FIG. 4. In a case where the combination vehicle stops at any one of two stations 106' in the hatched region, the combination vehicle is braked on a downhill. As illustrated in FIG. 1, the tow vehicle 10a of the combination vehicle is equipped with a longitudinal acceleration sensor 86 for detecting longitudinal acceleration Gx and a motor rotation angle sensor 88 for detecting a rotation speed do of the drive motor 14a. The brake central ECU 28 estimates inclination of the road surface on which the combination vehicle is currently traveling by excluding, from the detected longitudinal acceleration Gx, an influence of acceleration and deceleration of the combination vehicle obtained based on a change in the rotation speed do of the drive motor 14a. Based on the estimated inclination, the brake central ECU 28 determines whether the combination vehicle is being braked on the downhill whose gradient is larger than the set gradient. In this respect, a downhill portion or portions in the travel route 104 may be registered in the management center (management device) 110 in advance, and the brake central ECU 28 may recognize that the combination vehicle is traveling on the downhill whose gradient is larger than the set gradient based on information registered in and transmitted from the management center (management device) 110.

iv) Flow of Brake Control

Figure 6:
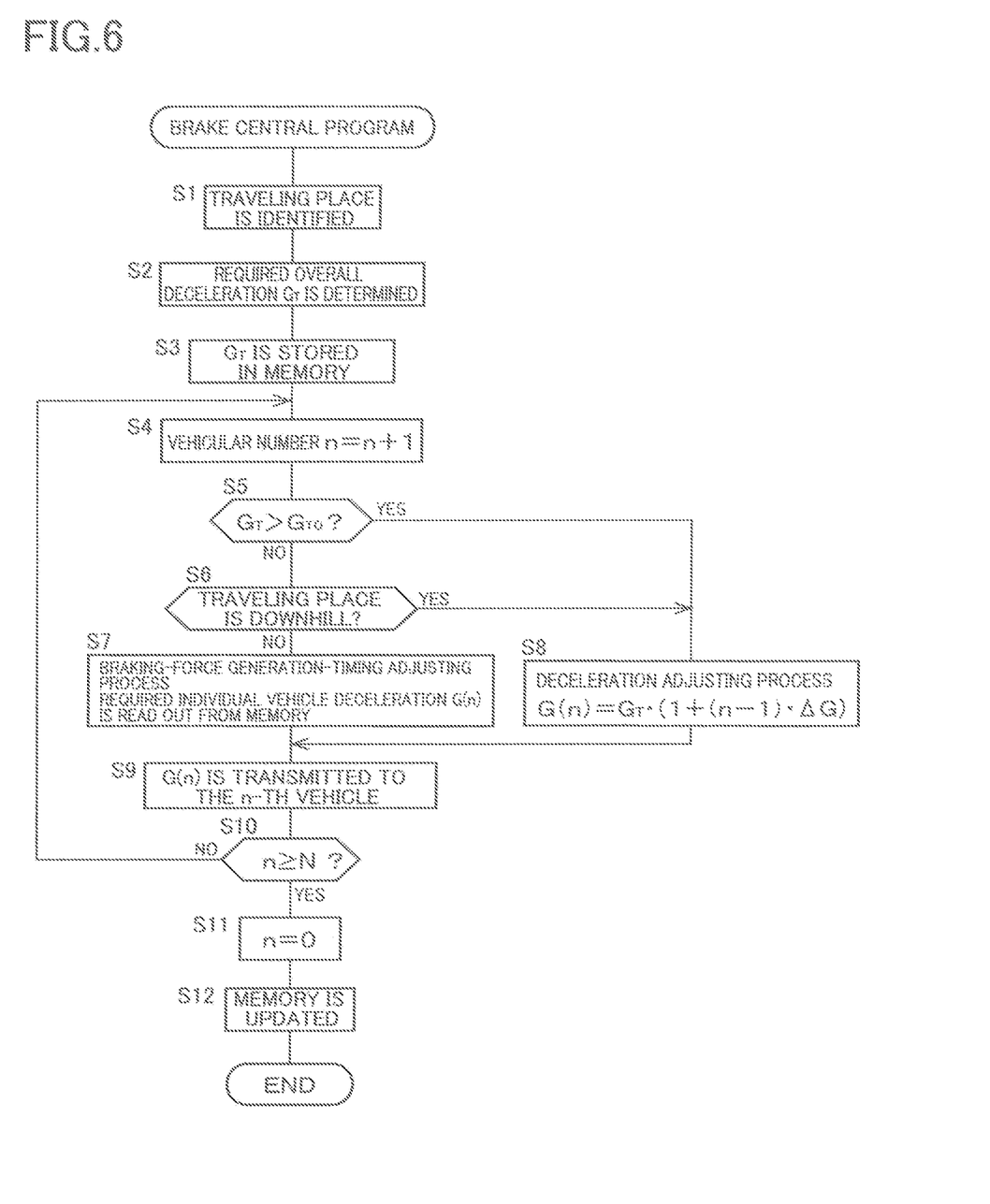
FIG. 6 is a flowchart representing a brake central program executed in the brake system according to the embodiment.
Figure 7:
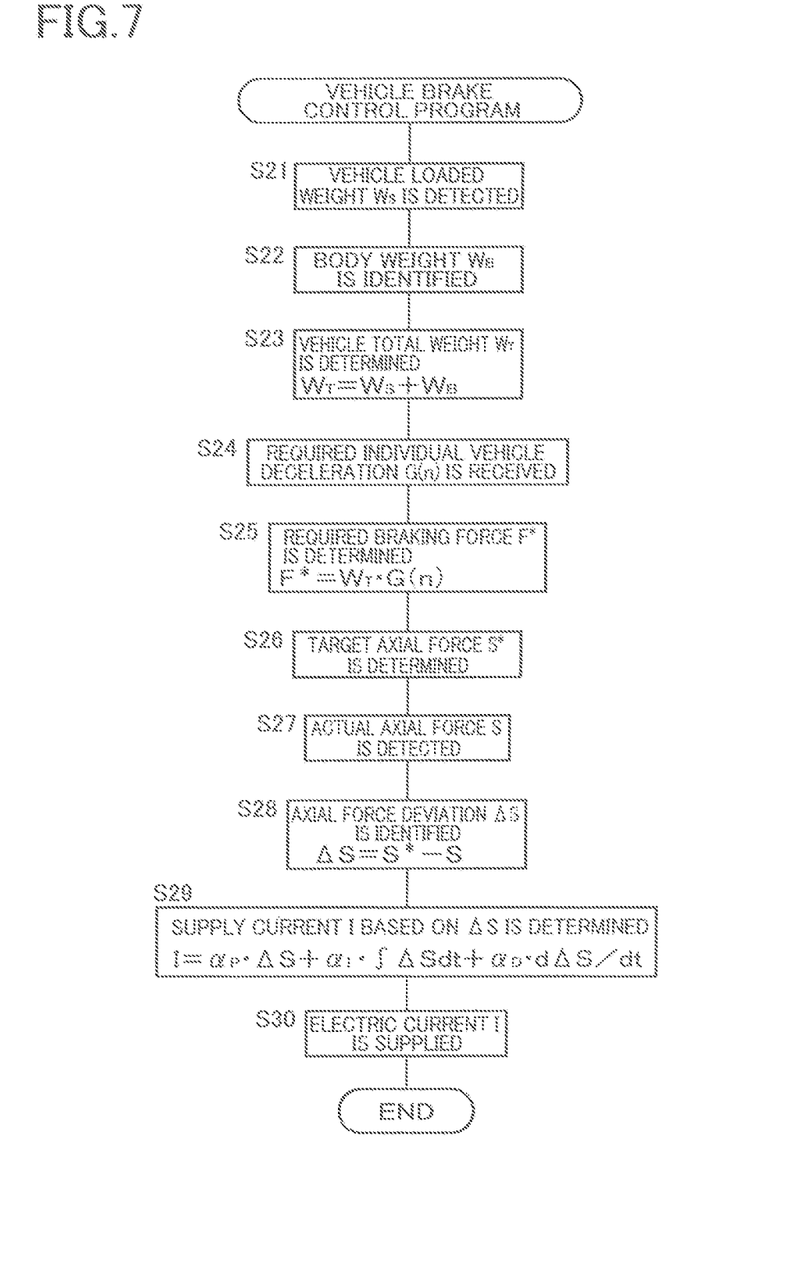
FIG. 7 is a flowchart representing a vehicle brake control program executed in the brake system according to the embodiment.

In the present brake system, the brake central ECU 28 repeatedly executes a brake central program represented by a flowchart of FIG. 6 and each of the electric brake ECUs 26 of the respective vehicles 10 repeatedly executes a vehicle brake control program represented by a flowchart of FIG. 7, each at a short time pitch, e.g., from several to several tens of milliseconds (msec), so that the brake control, specifically, the control of the braking force applied to each vehicle 10, is executed. Referring to the flowcharts, there will be hereinafter explained a flow of the brake control in the present brake system.

The process according to the brake central program starts with Step 1 at which the place where the combination vehicle is traveling, i.e., the inclination of the road surface on which the combination vehicle is traveling, is identified according to the technique described above. (Hereinafter, Step 1 will be abbreviated as "S1". Other steps will be similarly abbreviated.) At S2, the required overall deceleration $G_T$, which is the deceleration to be attained in the combination vehicle, is determined based on the operation amount 8 of the brake pedal 32 when the combination vehicle is driven by the driver or based on the information transmitted from the management center (management device) 110 when the combination vehicle is performing automated driving. At S3, the determined required overall deceleration $G_T$ is stored in the FIFO memory explained above.

The process at and after S4 is for determining the required individual vehicle deceleration G(n) of each vehicle 10 and is executed the number of times corresponding to the number of the vehicles 10 of the combination vehicle, namely, the number of times corresponding to the total number N of the vehicles 10. Thus, the vehicular number n of the vehicle 10 as a target of the process is incremented at S4.

At S5, it is determined whether the required overall deceleration $G_T$ is higher than the threshold deceleration GTO. At S6, it is determined whether the identified traveling place is the downhill whose gradient is larger than the set gradient. When the required overall deceleration $G_T$ is not higher than the threshold deceleration $G_{T0}$ and the traveling place is not the downhill whose gradient is larger than the set gradient, the control flow proceeds to S7. The process at S7 is a process for the braking-force generation-timing adjusting control explained above, i.e., a braking-force generation-timing adjusting process (that may also be referred to as a process of adjusting a moment of initiation of braking). In this process, the value in the cell of the vehicular number n of the target vehicle 10 is read out from the FIFO memory, and the required individual vehicle deceleration G(n) of that vehicle 10 is determined to be the value read out from the FIFO memory.

On the other hand, when the required overall deceleration $G_T$ is higher than the threshold deceleration $G_{T0}$ or when the traveling place is the downhill whose gradient is larger than the set gradient, the control flow proceeds to S8. The process at S8 is a process for the deceleration adjusting control explained above, i.e., a deceleration adjusting process. In this process, the required individual vehicle deceleration G(n) of the target vehicle 10 is determined according to the expression explained above.

After S7 or S8, the control flow proceeds to S9 at which the information on the required individual vehicle deceleration G(n) determined at S7 or S8 is transmitted to the target vehicle 10, namely, to each of the two electric brake ECUs 26 of the vehicle 10 whose vehicular number is n. At S10, it is determined whether the vehicular number n of the target vehicle 10 becomes equal to the total number N of the vehicles. If not, S4 and subsequent steps are repeated.

When it is determined at S10 that the vehicular number n becomes equal to the total number N of the vehicles, the vehicular number n of the target vehicle 10 is reset to 0 at S11, and the FIFO memory is updated at S12. After S12 is executed, one execution of the brake central program is ended.

The process according to the vehicle brake control program starts with S21 at which the vehicle loaded weight $W_S$ is detected via the loaded weight sensor 84. The vehicle loaded weight $W_S$ is a loaded weight of the vehicle 10 (target vehicle 10) on which is installed the brake device 24 to be controlled by execution of the program (hereinafter referred to as "target brake device 24" where appropriate). At S22, the stored body weight $W_B$ of the target vehicle 10 is identified. At S23, the vehicle loaded weight $W_S$ and the body weight $W_B$ are added to thereby determine the vehicle total weight $W_T$ of the target vehicle 10.

At S24, the information on the target vehicle 10 transmitted from the brake central ECU 28 is received, so that the required individual vehicle deceleration G(n) of the target vehicle 10 is identified. At S25, the required braking force F', which is the braking force to be generated by the target brake device 24, is determined based on the determined vehicle total weight $W_T$ and the identified required individual vehicle deceleration G(n). At S26, the target axial force S* is determined as the pushing force necessary for pushing the brake pads 54a, 54b against the disc rotor 50.

At S27, the actual axial force S is detected via the axial force sensor 82. At S28, the axial force deviation ΔS is identified. At S29, the electric current I to be supplied to the brake motor 66 of the target brake device 24 is determined according to the feedback control technique explained above. At S30, the determined electric current I is supplied to the brake motor 66. Thus, the braking force based on the required individual vehicle deceleration G(n) is generated by the target brake device 24.

What is claimed is:

1. A combination vehicle brake system comprising:
   a combination vehicle in which a plurality of vehicles are coupled in a line; and
   a brake system comprising:
      a plurality of brake devices respectively provided for the plurality of vehicles; and
      a controller configured to control the plurality of brake devices,
   wherein, when the combination vehicle is braked, the controller executes at least one of:
      a deceleration adjusting control in which a deceleration of one of any two of the plurality of vehicles that is located more rearward is not lower than a deceleration of the other of said any two of the plurality of vehicles that is located more frontward; and
      a braking-force generation-timing adjusting control in which a timing of generation of a braking force in one of any two of the plurality of vehicles that is located more frontward is not earlier than a timing of generation of a braking force in the other of said any two of the plurality of vehicles that is located more rearward,
   wherein the controller executes the deceleration adjusting control when a required overall deceleration is higher than a set deceleration and executes the braking-force generation-timing adjusting control when the required overall deceleration is not higher than the set deceleration, the required overall deceleration being a deceleration required for the combination vehicle as a whole.

2. The combination vehicle brake system according to claim 1, wherein the controller executes the deceleration adjusting control by controlling a braking force applied to each of the plurality of vehicles based on a loaded weight or a weight of each of the plurality of vehicles.

3. The combination vehicle brake system according to claim 1, wherein the controller executes the deceleration adjusting control such that a deceleration is higher for the vehicles located more rearward.

4. The combination vehicle brake system according to claim 1, wherein the controller executes the braking-force generation-timing adjusting control such that a timing of generation of a braking force is later for the vehicles located more frontward.

5. The combination vehicle brake system according to claim 1, wherein only a foremost vehicle among the plurality of vehicles of the combination vehicle includes a drive device, and each of the plurality of vehicles other than the foremost vehicle is capable of carrying objects and is towed by the foremost vehicle.

6. The combination vehicle brake system according to claim 1, wherein the combination vehicle is configured to travel along a set route by automated driving and to stop at one or more stop points set in the route.

7. The combination vehicle brake system according to claim 1, wherein the controller includes a plurality of in-vehicle units respectively provided for the plurality of vehicles so as to correspond to the plurality of brake devices, each of the plurality of in-vehicle units being configured to control a corresponding one of the plurality of brake devices.

8. The combination vehicle brake system according to claim 7, wherein the controller includes a central controller configured to communicate with each of the plurality of in-vehicle units and to centrally control the plurality of in-vehicle units.

9. A combination vehicle brake system comprising:
a combination vehicle in which a plurality of vehicles are coupled in a line; and
a brake system comprising:
a plurality of brake devices respectively provided for the plurality of vehicles; and
a controller configured to control the plurality of brake devices,
wherein, when the combination vehicle is braked, the controller executes at least one of:
a deceleration adjusting control in which a deceleration of one of any two of the plurality of vehicles that is located more rearward is not lower than a deceleration of the other of said any two of the plurality of vehicles that is located more frontward; and
a braking-force generation-timing adjusting control in which a timing of generation of a braking force in one of any two of the plurality of vehicles that is located more frontward is not earlier than a timing of generation of a braking force in the other of said any two of the plurality of vehicles that is located more rearward,
wherein the controller executes the deceleration adjusting control when the combination vehicle is braked at a specific place and executes the braking-force generation-timing adjusting control when the combination vehicle is braked at a place other than the specific place.

10. The combination vehicle brake system according to claim 9, wherein the specific place is a downhill.

11. The combination vehicle brake system according to claim 9, wherein the controller executes the deceleration adjusting control by controlling a braking force applied to each of the plurality of vehicles based on a loaded weight or a weight of each of the plurality of vehicles.

12. The combination vehicle brake system according to claim 9, wherein the controller executes the deceleration adjusting control such that a deceleration is higher for the vehicles located more rearward.

13. The combination vehicle brake system according to claim 9, wherein the controller executes the braking-force generation-timing adjusting control such that a timing of generation of a braking force is later for the vehicles located more frontward.

14. The combination vehicle brake system according to claim 9, wherein only a foremost vehicle among the plurality of vehicles of the combination vehicle includes a drive device, and each of the plurality of vehicles other than the foremost vehicle is capable of carrying objects and is towed by the foremost vehicle.

15. The combination vehicle brake system according to claim 9, wherein the combination vehicle is configured to travel along a set route by automated driving and to stop at one or more stop points set in the route.

16. The combination vehicle brake system according to claim 9, wherein the controller includes a plurality of in-vehicle units respectively provided for the plurality of vehicles so as to correspond to the plurality of brake devices, each of the plurality of in-vehicle units being configured to control a corresponding one of the plurality of brake devices.

17. The combination vehicle brake system according to claim 16, wherein the controller includes a central controller configured to communicate with each of the plurality of in-vehicle units and to centrally control the plurality of in-vehicle units.

* * * * *